United States Patent
Poole et al.

(10) Patent No.: US 8,551,354 B2
(45) Date of Patent: Oct. 8, 2013

(54) REFRIGERANT COMPOSITION

(75) Inventors: John Edward Poole, Altrincham (GB); Richard Powell, Bunbury (GB)

(73) Assignee: RPL Holdings Limited, Hale, Altrincham (GB)

( * ) Notice: Subject to any disclaimer, the term of this patent is extended or adjusted under 35 U.S.C. 154(b) by 164 days.

(21) Appl. No.: 12/281,304

(22) PCT Filed: Mar. 5, 2007

(86) PCT No.: PCT/GB2007/000746
§ 371 (c)(1), (2), (4) Date: Nov. 7, 2008

(87) PCT Pub. No.: WO2007/099350
PCT Pub. Date: Sep. 7, 2007

(65) Prior Publication Data
US 2009/0242828 A1 Oct. 1, 2009

(30) Foreign Application Priority Data

Mar. 3, 2006 (GB) .................................. 0604305.3
Oct. 3, 2006 (GB) .................................. 0619467.4

(51) Int. Cl.
*C09K 5/04* (2006.01)

(52) U.S. Cl.
USPC ........................................................ 252/67

(58) Field of Classification Search
USPC .................................................... 252/67, 68
See application file for complete search history.

(56) References Cited

U.S. PATENT DOCUMENTS

| | | | |
|---|---|---|---|
| 4,138,855 A | 2/1979 | Jahan et al. | |
| 4,198,313 A | 4/1980 | Bargigia et al. | |
| 4,272,960 A | 6/1981 | Wahl, III | |
| 4,482,465 A | 11/1984 | Gray | |
| 4,810,403 A | 3/1989 | Bivens et al. | |
| 4,941,986 A | 7/1990 | Jolly | |
| 4,944,890 A | 7/1990 | Deeb et al. | |
| 5,026,497 A | 6/1991 | Merchant | |
| 5,080,823 A | 1/1992 | Arnaud et al. | |
| 5,108,637 A | 4/1992 | Pearson | |
| 5,182,040 A | 1/1993 | Bartlett et al. | |
| 5,304,320 A | 4/1994 | Barthelemy et al. | |
| 5,360,566 A | 11/1994 | Stevenson | |
| 5,370,812 A | 12/1994 | Brown | |
| 5,417,871 A | 5/1995 | Minor et al. | |
| 5,425,890 A | 6/1995 | Yudin et al. | |
| 5,458,798 A | 10/1995 | Lunger et al. | |
| 5,622,644 A | 4/1997 | Stevenson et al. | |
| 5,624,596 A | 4/1997 | Lunger et al. | |
| 5,626,790 A | 5/1997 | Minor | |
| 5,672,293 A | 9/1997 | Minor et al. | |
| 5,685,163 A | 11/1997 | Fujita et al. | |
| 5,785,883 A | 7/1998 | Minor et al. | |
| 6,106,740 A | 8/2000 | Powell et al. | |
| 6,117,356 A | 9/2000 | Powell et al. | |
| 6,526,764 B1 | 3/2003 | Singh et al. | |
| 6,604,368 B1 | 8/2003 | Powell et al. | |
| 6,606,868 B1 | 8/2003 | Powell et al. | |
| 6,629,419 B1 | 10/2003 | Powell et al. | |
| 6,783,691 B1 | 8/2004 | Bivens et al. | |
| 6,991,743 B2 | 1/2006 | Poole et al. | |
| 7,972,528 B2 | 7/2011 | Poole et al. | |
| 8,465,664 B2 | 6/2013 | Poole et al. | |
| 2007/0290163 A1 | 12/2007 | Poole et al. | |
| 2009/0224199 A1 | 9/2009 | Poole et al. | |
| 2011/0226983 A1 | 9/2011 | Poole et al. | |
| 2012/0312048 A1 | 12/2012 | Poole et al. | |

FOREIGN PATENT DOCUMENTS

| | | |
|---|---|---|
| DE | 4116274 | 11/1992 |
| EP | 0539952 | 10/1992 |
| EP | 0608164 | 7/1994 |
| EP | 0659862 | 7/1994 |
| EP | 0430169 | 8/1994 |
| EP | 0565265 | 12/1995 |
| EP | 0720639 | 6/1997 |
| EP | 0779352 | 6/1997 |
| EP | 1193305 A1 * | 4/2002 |
| EP | 0509673 | 11/2003 |
| JP | 04-018484 | 1/1992 |
| JP | 07-173462 | 7/1995 |
| JP | 08-143696 | 6/1996 |
| JP | 08-170074 | 7/1996 |
| JP | 09-208940 | 8/1997 |
| JP | 11-181414 | 7/1999 |
| WO | 92/01762 | 2/1992 |
| WO | 92/11339 | 7/1992 |
| WO | 92/16597 | 10/1992 |
| WO | 94/26835 | 11/1994 |
| WO | 95/08602 | 3/1995 |
| WO | 96/03473 | 2/1996 |
| WO | WO 96/03472 A1 * | 2/1996 |
| WO | 97/15637 | 1/1997 |
| WO | 97/07179 | 2/1997 |
| WO | 98/08912 | 3/1998 |
| WO | 99/36485 | 7/1999 |
| WO | 2005/083028 | 9/2005 |

OTHER PUBLICATIONS

U.S. Appl. No. 12/281,306, "Refrigerant Composition", Poole et al., filed Aug. 29, 2008.
U.S. Appl. No. 12/281,306, Office Action mailed Oct. 18, 2010.
U.S. Appl. No. 12/281,306, Notice of Allowance mailed Apr. 1, 2011.
U.S. Appl. No. 12/281,306, Allowed Claims.
U.S. Appl. No. 13/118,304, "Refrigerant Composition", Poole et al., filed May 27, 2011.
U.S. Appl. No. 13/118,304, Office Action mailed Nov. 29, 2011.
U.S. Appl. No. 13/118,304, Office Action mailed Jun. 6, 2012.
U.S. Appl. No. 13/118,304, Office Action mailed Oct. 15, 2012.
U.S. Appl. No. 13/118,304, Notice of Allowance mailed May 6, 2013.

* cited by examiner

*Primary Examiner* — John Hardee
(74) *Attorney, Agent, or Firm* — Weaver Austin Villeneuve & Sampson LLP

(57) ABSTRACT

A refrigerant composition consists essentially of a combination of two hydro fluorocarbon components selected from R125 and R143a and an additive selected from a saturated or unsaturated hydrocarbon or mixture thereof boiling in the range −50° C. and +40° C.

7 Claims, No Drawings

REFRIGERANT COMPOSITION

FIELD OF THE INVENTION

This invention relates to a refrigerant particularly but not exclusively for refrigeration systems. The system relates especially to refrigerant compositions which have no adverse effect on the atmospheric ozone layer and to compositions which are for use in refrigeration systems designed to use Ozone Depleting Substances (ODS) including CFC502 (an azeotrope of chloropentafluoromethane and chlorodifluoromethane)) and HCFC22 (chlorodifluoromethane). These refrigerant compositions are compatible with lubricants commonly found in refrigeration and air conditioning systems and also with oxygen containing lubricants including but not restricted to polyol ester and polyalkylene glycol oils.

The compositions of this invention may also be used in new equipment.

Although considerable care is taken to prevent leakage of refrigerant to the atmosphere, on occasions this does occur. In some territories the emission of hydrocarbons is regulated to minimise the generation of tropospheric ozone caused by the effect of sunlight on hydrocarbons mixed with oxygen. To minimise the contribution of hydrocarbon to the atmosphere by leakage of the blends which are the subject of this invention, the hydrocarbon content should be preferably less than 5% more preferably less than 3%.

BACKGROUND OF THE INVENTION

Chlorofluorocarbons (CFCs e.g. CFC 11, CFC 12, CFC502) and hydrochlorofluorocarbons (HCFCs eg HCFC 22, HCFC 123) are stable, of low toxicity and non-flammability providing low hazard working conditions when used in refrigeration and air conditioning systems. If released, they permeate into the stratosphere and attack the ozone layer which protects the environment from the damaging effects of ultraviolet rays. The Montreal Protocol, an international environmental agreement signed by over 160 countries, mandates the phase-out of CFCs and HCFCs according to an agreed timetable.

CFCs and HCFCs have been superseded in new air conditioning, refrigeration and heat pump equipment by hydrofluorocarbons (HFCs eg HFC134a, HFC125, HFC 32, HFC143a, HFC152a) either as pure fluids or as blends. However, HFCs do not have adequate solubility in traditional lubricants such as mineral and alkylbenzene oils so that synthetic oxygen containing lubricants have been introduced specifically for new equipment. These new lubricants are expensive and hygroscopic.

Some refrigerants, such as R407C, have wide temperature glides (>4° C.) in the evaporator and condenser. Equipment manufacturers, based on their experience with CFC/HCFC single fluids or azeotropes, prefer refrigerants with low glides. A further object of this invention is to provide HFC/hydrocarbon blends that can substitute for R22 and azeotrope R502 (CFC 115/HCFC 22) in order to allow the continued use of hydrocarbon lubricants in equipment and minimising the temperature glides in the heat exchangers by providing azeotropic and near azeotropic formulations.

Various terms have been used in patent literature to describe refrigerant mixtures. The following definitions are taken from ASHRAE Standard 34;

Azeotrope: an azeotropic blend is one containing two or more refrigerants whose equilibrium vapour and liquid phase compositions are the same at a given pressure. Azeotropic blends exhibit some segregation of components at other conditions. The extent of the segregation depends on the particular azeotrope and the application.

Azeotropic temperature: the temperature at which the liquid and vapour phases of a blend have the same mole fractionation of each component at equilibrium for a specified pressure.

Near azeotrope: a zeotropic blend with a temperature glide sufficiently small that it may be disregarded without consequential error in analysis for a specific application.

Zeotrope: blends comprising multiple components of different volatilities that, when used in refrigeration cycles, change volumetric composition and saturation temperatures as they evaporate (boil) or condense at constant pressure.

Temperature glide: the absolute value of the difference between the starting and ending temperatures of a phase-change process by a refrigerant within a component of a refrigerating system, exclusive of any subcooling or superheating. This term usually describes condensation or evaporation of a zeotrope.

The present invention relates to azeotropic, near azeotropic and zeotropic refrigerant compositions, which are non flammable under all conditions of fractionation as defined under ASHRAE Standard 34, and which can be used to replace ODS in an existing or new unit without the need to change the lubricant or make any significant change to the system hardware.

While it is known in the art that the addition of a small amount of hydrocarbon to a refrigerant composition containing an HFC or HFC mixtures can result in sufficient hydrocarbon being dissolved in the lubricant to be transported around the system so that lubrication of the compressor is maintained at all times, it is not well understood how to achieve non flammable compositions under all conditions including fractionation of the refrigerant compositions which can take place during a leak of the refrigerant from The system or during storage.

Not all HFCs are non flammable as defined under ASHRAE Standard 34. HFC143a has not received a non flammable rating by ASHRAE. This invention relates to compositions of refrigerants which covers blends of non flammable HFC125 with flammable HFC143a and hydrocarbons in selected proportions selected so that all such compositions are non flammable during fractionation while providing similar refrigerating effects and thermodynamic performances as the ODS they replace, namely R502 and R22.

While this invention relates to refrigerant compositions which can be used with traditional lubricants such as mineral and alkylbenzene oils, they are also suitable for use with synthetic oxygen containing lubricants.

To avoid flammability in the blend, or in a fraction generated by a leak, for example as defined by ASHRAE Standard 34, the total amount of hydrocarbon should be minimised. At the same time the quantity of the hydrocarbon mixture dissolved in the oil needs to be maximised for good oil return, especially at those locations in the circuit where the oil is at its most viscous, for example the evaporator. A single higher boiling hydrocarbon, such as butane or isobutane, would certainly show higher solubility in the oil than a lower boiling hydrocarbon such as propane. However, as the result of a leak, for example from a cylinder, a higher boiling hydrocarbon will concentrate in the liquid phase. The amount of hydrocarbon, therefore, needs to be limited in order to avoid generating a flammable mixture towards the end of the leak.

This problem can be avoided by using only a low boiling hydrocarbon such as propane. However, this has two disadvantages. Firstly, lower boiling hydrocarbons are less soluble than higher boiling hydrocarbons in hydrocarbon lubricants in the evaporator when present at similar weights percent as formulated in the blend. Consequently they are less effective at ensuring good oil ret. Secondly, because of their higher volatility they tend to concentrate in the vapour phase of a blend. Their concentration, therefore needs, to be restricted to avoid generating flammable mixtures at the beginning of a leak. This problem is exacerbated if the lower boiling HFC is also flammable.

The ratio of R143a to R125 and the presence of the lower boiling propane with the higher boiling isobutane results in a non flammable mixture at worst case fractionation as defined by ASHRAE Standard 34. The following test results were carried out by independent external laboratories:

| Sample 1: | % |
|---|---|
| R125 | 76.81 |
| R143a | 18.66 |
| Propane | 2.38 |
| Isobutane | 2.16 |
| Total hydrocarbon | 4.54 |

Flammability test using a 12 litre flask as per ASHRAE standard was conducted on this mixture at 60° C. and was found to be non flammable.

| Sample 2: | % |
|---|---|
| R125 | 74 |
| R143a | 22 |
| Isobutane | |

The same flammability test as per sample 1 was conducted on this mixture which was found to be flammable with a Lower Flammable Limit of 15% v/v at 60° C.

In patent number EP 12380 39B1 Roberts teaches away from the inclusion of methyl propane (isobutane) in blends containing HFCs due to flammability concerns at worst case fractionation. In U.S. Pat. No. 6,526,764 B1 Honeywell teaches away from the addition of propane due to an undesirable increase in the pressure in the system.

Surprisingly we have found that the addition of propane to a HFC blend containing a combination of HFC125 HFC143a with a higher boiling hydrocarbon such as isobutane results in a lower level of flammability thereby enabling the blend to be non flammable under all conditions of fractionation under ASHRAE Standard 34. This allows the total amount of hydrocarbon of the blend to be reduced while simultaneously the amount dissolved in the oil in the evaporator is increased.

This invention enables a flammable HFC such as HFC143a to be used in a non flammable refrigerant blend thereby substantively improving its performance, in particular its capacity In U.S. Pat. No. 5,211,867, azeotropic compositions are claimed of R125 and R143a, but it does not teach that hydrocarbons can be usefully added to the blends of these two HFCs. It is a key feature of this invention that a specially selected hydrocarbon or mixtures of hydrocarbons are present in order to facilitate oil return to the compressor. Surprisingly it has been found that, despite the flammability of HFC143a, the selection of a hydrocarbon or mixtures of hydrocarbons enables the compositions to be non flammable during fractionation. The combination of a low boiling hydrocarbon such as propane (BP −45.5° C.) with a higher boiling hydrocarbon such as butane (BP −0.5° C.) and/or isobutane (BP −11.5° C.) avoids build up of hydrocarbon content in the liquid phase during a leakage while the more volatile propane is countered in the vapour phase by azeotroping with the fire suppressant HFC125.

In the search for a refrigerant blend that can be readily used to replace R22 or R502 in existing equipment, it is especially important that the new blend should have an adequate refrigeration capacity. The capacity should be at least 90% of that of the fluid it is replacing, more preferably at least 95% of that of the fluid it is replacing aid most preferably equal to or greater than that of the fluid it is replacing under similar operating conditions. Should a retrofit blend with too low a capacity be used, there is a significant risk that under high load conditions the refrigeration system will not maintain the desired low temperature thereby resulting in shortening the storage life of frozen foodstuffs or other materials being stored at low temperature In selecting an acceptable refrigerant blend, equipment reliability is also important. The inclusion of hydrocarbons in the present blends ensures that oil leaving the sump of the compressor returns to the sump thus preventing inadequate lubrication of the compressor bearings and pistons which could occur if the oil was retained elsewhere in the system.

A further important factor is the discharge temperature of the refrigerant leaving the compressor. If the discharge temperatures are too high, the discharge valves can be damaged by over heating and/or by the deposition of solid decomposition products from the oil and the refrigerant. The blends shown in the examples all have lower discharges temperatures than that of R502 and much lower than that of R2. The present blends also benefit from the absence of chlorine. R502 and especially R22 have the potential at discharge temperatures to produce corrosive hydrochloric acid, especially if traces of water are present.

According to the present invention a refrigerant composition consists essentially of a combination of a hydrofluorocarbon component consisting of at lease one of the following mixtures:

R125 and R143a and an additive selected from a saturated hydrocarbon or mixture thereof boiling in the range −50° C. and +40° C.

In a first preferred embodiment the hydrocarbon is present in an amount from 0.1 to 5% and wherein the composition is non flammable when completely in the vapour phase.

In a second preferred embodiment the hydrocarbon is present in an amount from 0.1 to 5% and wherein the composition is in a container where both liquid and vapour are present, neither vapour nor liquid phase is flammable.

In a preferred embodiment, a refrigerant composition which may find application to replace R502 comprises:
 (i) from about 50 to 94.9 weight percent of R125 preferably 66 to 84.7 weight percent of R125; and
 (ii) from about 5 to 45 weight percent of R143a preferably 15 to 30 weight percent of R143; and
 (iii) from about 0.1 to 5 weight percent of butane or isobutane or propane preferably 0.3 to 4 weight percent of butane or isobutane or propane.

In another embodiment, a refrigerant composition which may find application to replace R502 comprises:
 (i) from about 45 to 94.8 weight percent of R1125 preferably 62 to 84.4 weight percent of R125; and
 (ii) from about 5 to 45 weight percent of R143a preferably 15 to 30 weight percent of R143; and
 (iii) mixtures of butane from about 0.1 to 5 weight percent and isobutane from about 0.1 to 5 weight percent or mixtures of butane (0.1 to 5) and propane (0.1 to 5%) or mixtures of isobutane (0.1 to 5%) and propane (0.1 to 5%), preferably 0.3 to 4 weight percent of mixtures of butane (0.3 to 4%) and isobutane (0.3 to 4%) or mixtures of butane (0.3 to 4%) propane (0.3 to 4%) or mixtures of isobutane (0.3 to 4%) and propane (0.3 to 4).

In another preferred embodiment, a refrigerant composition which may find application to replace R502 comprises:

(i) from about 40 to 94.7 weight percent of R125 preferably 58 to 84.1 weight percent of R125: and (ii) from about 5 to 45 weight percent of R143a preferably 15 to 30 weight percent of R143: and (iii) mixtures of butane from about 0.1 to 5 weight percent and isobutane from about 0.1 to 5 weight percent and propane from about 0.1 to 5 weight percent, preferably 0.3 to 4 weight percent of mixtures of butane (0.3 to 4%) and isobutane (0.3 to 4%) and propane (0.3 to 4%)

A preferred composition which may find application as a replacement for R502 consists essentially of:

| | |
|---|---|
| R125 | 82.4 to 68% |
| R143a | 17 to 27% |
| Isobutane | 0.3 to 3% |
| Propane | 0.3 to 2% |

Yet another preferred composition which may find application as a replacement for R502 consists essentially of:

| | |
|---|---|
| R125 | 77% |
| R143a | 20% |
| Isobutane | 2% |
| Propane | 1% |

In yet another particularly preferred embodiment there is provided azeotropic compositions which may find application to replace R502 comprising:

| | % | |
|---|---|---|
| | Blend 1 | Blend 2 |
| R125 | 73.07 | 73.07 |
| R143a | 23.87 | 23.87 |
| Propane | 0.31 | 0.6 |
| Isobutane | 2.75 | 2.46 |

A preferred composition consists essentially of:

| | |
|---|---|
| R125 | 94.9 to 50% |
| R143a | 5 to 45% |
| Butane | 0.1 to 5% |

A preferred composition consists essentially of:

| | |
|---|---|
| R125 | 84.7 to 66% |
| R143a | 15 to 30% |
| Butane | 0.3 to 4% |

A particularly preferred composition consists essentially of:

| | |
|---|---|
| R125 | 77.5% |
| R143a | 20% |
| Isobutane | 2.5.% |

Another preferred composition consists essentially of:

| | |
|---|---|
| R125 | 78% |
| R143a | 20% |
| Isobutane | 2% |

Another preferred composition consists essentially of:

| | |
|---|---|
| R125 | 79% |
| R143a | 18% |
| Isobutane | 3.% |

Yet another preferred composition consists essentially of:

| | |
|---|---|
| R125 | 77.2% |
| R143a | 20% |
| Isobutane | 2.8.% |

A preferred composition consists essentially of:

| | |
|---|---|
| R125 | 94.9 to 50% |
| R143a | 5 to 45% |
| Isobutane | 0.1 to 5% |

A preferred composition consists essentially of:

| | |
|---|---|
| R125 | 84.7 to 66% |
| R143a | 15 to 30% |
| Isobutane | 0.3 to 4% |

A preferred composition consists essentially of:

| | |
|---|---|
| R125 | 94.9 to 50% |
| R143a | 5 to 45% |
| Propane | 0.1 to 5% |

A preferred composition consists essentially of:

| | |
|---|---|
| R125 | 84.7 to 66% |
| R143a | 15 to 30% |
| Propane | 0.3 to 4% |

A preferred composition consists essentially of:

| | |
|---|---|
| R125 | 94.8 to 45% |
| R143a | 5 to 45% |
| Butane | 0.1 to 5% |
| Isobutane | 0.1 to 5% |

A preferred composition consists essentially of:

| | |
|---|---|
| R125 | 84.4 to 62% |
| R143a | 15 to 30% |
| Butane | 0.3 to 4% |
| Isobutane | 0.3 to 4% |

A preferred composition consists essentially of:

| | |
|---|---|
| R125 | 94.8 to 45% |
| R143a | 5 to 45% |
| Butane | 0.1 to 5% |
| Propane | 0.1 to 5% |

A preferred composition consists essentially of:

| | |
|---|---|
| R125 | 84.4 to 62% |
| R143a | 15 to 30% |
| Butane | 0.3 to 4% |
| Propane | 0.3 to 4% |

A preferred composition consists essentially of:

| | |
|---|---|
| R125 | 94.8 to 45% |
| R143a | 5 to 45% |
| Isobutane | 0.1 to 5% |
| Propane | 0.1 to 5% |

A preferred composition consists essentially of:

| | |
|---|---|
| R125 | 84.4 to 62% |
| R143a | 15 to 30% |
| Isobutane | 0.3 to 4% |
| Propane | 0.3 to 4% |

A preferred composition consists essentially of:

| | |
|---|---|
| R125 | 94.7 to 40% |
| R143a | 5 to 45% |
| Butane | 0.1 to 5% |
| Isobutane | 0.1 to 5% |
| Propane | 0.1 to 5% |

A preferred composition consists essentially of:

| | |
|---|---|
| R125 | 84.1 to 58% |
| R143a | 15 to 30% |
| Butane | 0.3 to 4% |
| Isobutane | 0.3 to 4% |
| Propane | 0.3 to 4% |

A preferred composition consists essentially of:

| | |
|---|---|
| R125 | 82.4 to 68% |
| R143a | 17 to 27% |
| Isobutane | 0.3 to 3% |
| Propane | 0.3 to 2% |

A preferred composition consists essentially of:

| | |
|---|---|
| R125 | 73.07% |
| R143a | 23.87% |
| Propane | 0.31% |
| Isobutane | 2.75% |

A preferred composition consists essentially of,

| | |
|---|---|
| R125 | 73.07% |
| R143a | 23.87% |
| Propane | 0.6% |
| Isobutane | 2.46% |

A preferred composition consists essentially of:

| | |
|---|---|
| R125 | 73.07% |
| R143a | 23.87% |
| Isobutane | 3.06 |

Percentages and other proportions referred to in this specification are by weight unless indicated otherwise and are selected to total 100% from within the ranges disclosed.

In a preferred embodiment of the invention a refrigerant composition consists essentially of a combination of a hydrofluorocarbon component comprising:

| | |
|---|---|
| R125 and | 83 to 71%; |
| R143a | 17 to 29% | and an additive selected from a saturated or unsaturated hydrocarbon or mixture thereof boiling in the range −50° C. and +15° C.

The hydrocarbon additive may be selected from the group consisting of 2-methylpropane, propane, 2,2-dimethylpropane, n-butane, 2-methylbutane, cyclopentane, hexane, ethane, 2-methylpentane, 3-methylpentane, 2,2-dimethylbutane, methylcyclopentane and mixtures thereof.

A first especially preferred refrigerant composition which may find application as a replacement for R502 and R22 consists essentially of:

| | |
|---|---|
| R125 | 82.7 to 71.5% |
| R143a | 17 to 25% |
| Butane | 0.3 to 3.5% |

A second especially preferred refrigerant composition which may find application as a replacement for R502 and R22 consists essentially of:

| | |
|---|---|
| R125 | 80.4 to 75% |
| R143a | 19 to 22% |
| Butane | 0.6 to 3 |

A further preferred refrigerant composition which may find application as a replacement for R502 and R22 consists essentially of:

| | |
|---|---|
| R125 | 82.7 to 71.5% |
| R143a | 17 to 25% |
| Isobutane | 0.3 to 3.5% |

Another preferred refrigerant composition which may find application as a replacement for R502 and R22 consists essentially of:

| | |
|---|---|
| R125 | 80.4 to 75% |
| R143a | 19 to 22% |
| Isobutane | 0.6 to 3% |

A preferred refrigerant composition which may find application as a replacement for R502 and R22 consists essentially of:

| | |
|---|---|
| R125 | 82.7 to 73% |
| R143a | 17 to 25% |
| Propane | 0.3 to 2% |

A further preferred refrigerant composition which may find application as a replacement for R502 and R22 consists essentially of:

| | |
|---|---|
| R125 | 80.7 to 76.5% |
| R143a | 19 to 22% |
| Propane | 0.3 to 1.5 |

Another preferred refrigerant composition which may find application as a replacement for R502 and R22 consists essentially of:

| | |
|---|---|
| R125 | 82.4 to 71% |
| R143a | 17 to 25% |
| Butane | 0.3 to 2% |
| Isobutane | 0.3 to 2% |

Yet another preferred refrigerant composition which may find application as a replacement for R502 and R22 consists essentially of:

| | |
|---|---|
| R125 | 79.8 to 74.5% |
| R143a | 19 to 22% |
| Butane | 0.6 to 1.75% |
| Isobutane | 0.6 to 1.75% |

A preferred refrigerant composition which may find application as a replacement for R502 and R22 consists essentially of:

| | |
|---|---|
| R125 | 82.4 to 71% |
| R143a | 17 to 25% |
| Butane | 0.3 to 2.5% |
| Propane | 0.3 to 1.5% |

A further preferred refrigerant composition which may find application as a replacement for R502 and R22 consists essentially of:

| | |
|---|---|
| R125 | 79.8 to 75% |
| R143a | 19 to 22% |
| Butane | 0.6 to 2% |
| Propane | 0.6 to 1% |

Another referred refrigerant composition which may find application as a replacement for R502 and R22 consists essentially of:

| | |
|---|---|
| R125 | 82.4 to 71% |
| R143a | 17 to 25% |
| Isobutane | 0.3 to 2.5% |
| Propane | 0.3 to 1.5% |

A particularly preferred refrigerant composition which may find application as a replacement for R502 and R22 consists essentially of:

| | |
|---|---|
| R125 | 79.8 to 75% |
| R143a | 19 to 22% |
| Isobutane | 0.6 to 2% |
| Propane | 0.6 to 1% |

A most particularly preferred refrigerant composition which may find application as a replacement for R502 and R22 consists essentially of:

| | |
|---|---|
| R125 | 77.5% |
| R143a | 20% |
| Isobutane | 1.9% |
| Propane | 0.6% |

The invention is further described by means of examples but not in a limitative sense.

EXAMPLE 1

Blends of R125, R143a, R290 and R600a were evaluated at typical low temperature refrigeration conditions using NIST's CYCLE D program.

| | |
|---|---|
| COOLING DUTY DELIVERED EVAPORATOR | 10 kW |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |

-continued

| LIQUID LINE/SUCTION LINE HEAT EXCHANGER | |
|---|---|
| Efficiency | 0.3 |
| COMPRESSOR | |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 1 & 2

TABLE 1

| | Refrigerant | | | | | |
|---|---|---|---|---|---|---|
| | 1 | 2 | 3 | 4 | 5 | 6 |
| Weight % 125 | 77.5 | 77.5 | 77.5 | 77.5 | 77.5 | 77.5 |
| Weight % 143a | 20 | 20 | 20 | 20 | 20 | 20 |
| Weight % 600a | 1.9 | 1.9 | 1.9 | 1.9 | 1.9 | 1.9 |
| Weight % 290 | 0.6 | 0.6 | 0.6 | 0.6 | 0.6 | 0.6 |
| Evaporating temperature (° C.) | −50 | −40 | −30 | −20 | −10 | 0 |
| Discharge pressure (bar) | 17.58 | 17.58 | 17.58 | 17.58 | 17.58 | 17.58 |
| Discharge temperature (° C.) | 99.5 | 88.7 | 79.5 | 71.6 | 64.6 | 58.5 |
| COP (system) | 0.97 | 1.20 | 1.48 | 1.85 | 2.33 | 3.00 |
| Capacity (kW/m$^3$) | 355 | 590 | 937 | 1434 | 2125 | 3068 |
| Glide in evaporator (° C.) | 0.37 | 0.42 | 0.47 | 0.52 | 0.56 | 0.60 |
| Glide in condenser (° C.) | 0.66 | 0.66 | 0.66 | 0.66 | 0.66 | 0.66 |

TABLE 2

| | Refrigerant | | | | | |
|---|---|---|---|---|---|---|
| | 1 | 2 | 3 | 4 | 5 | 6 |
| Weight % 125 | 77.5 | 77.5 | 77.5 | 77.5 | 77.5 | 77.5 |
| Weight % 143a | 20 | 20 | 20 | 20 | 20 | 20 |
| Weight % 600a | 2.5 | 2.5 | 2.5 | 2.5 | 2.5 | 2.5 |
| Evaporating temperature (° C.) | −50 | −40 | −30 | −20 | −10 | 0 |
| Discharge pressure (bar) | 17.26 | 17.26 | 17.26 | 17.26 | 17.26 | 17.26 |
| Discharge temperature (° C.) | 99.3 | 88.5 | 79.3 | 71.4 | 64.5 | 58.4 |
| COP (system) | 0.98 | 1.20 | 1.48 | 1.85 | 2.34 | 3.01 |
| Capacity (kW/m$^3$) | 349 | 580 | 922 | 1411 | 2092 | 3021 |
| Glide in evaporator (° C.) | 0.3 | 0.3 | 0.4 | 0.4 | 0.5 | 0.5 |
| Glide in condenser (° C.) | 0.6 | 0.6 | 0.6 | 0.6 | 0.6 | 0.6 |

EXAMPLE 2

Blends of R125, R143a and R290 were evaluated at a typical low temperature refrigeration condition using NIST's CYCLE D program.

| COOLING DUTY DELIVERED | 10 kW |
|---|---|
| EVAPORATOR | |
| Midpoint fluid condensing temperature | −30° C. |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 3.

TABLE 3

| | Refrigerant | | | | |
|---|---|---|---|---|---|
| | 1 | 2 | 3 | 4 | 5 |
| Weight % 125 | 73 | 75.5 | 77 | 81 | 74 |
| Weight % 143a | 25 | 23 | 21 | 17 | 25 |
| Weight % 290 | 2 | 1.5 | 2 | 2 | 1 |
| Discharge pressure (bar) | 17.63 | 17.55 | 17.76 | 17.90 | 17.34 |
| Discharge temperature (° C.) | 80.8 | 80.3 | 80.1 | 79.5 | 80.5 |
| COP (system) | 1.47 | 1.47 | 1.47 | 1.46 | 1.48 |
| Capacity (kW/m$^3$) | 976 | 969 | 978 | 980 | 961 |
| Glide in evaporator (° C.) | 0.61 | 0.50 | 0.65 | 0.69 | 0.34 |
| Glide in condenser (° C.) | 0.64 | 0.56 | 0.69 | 0.73 | 0.41 |

EXAMPLE 3

Blends of R125, R143a and 600a were evaluated at a typical low temperature refrigeration condition using NIST's CYCLE D program.

| COOLING DUTY DELIVERED | 10 kW |
|---|---|
| EVAPORATOR | |
| Midpoint fluid condensing temperature | −30° C. |
| Superheating | 5.0° C. |
| Suction line pressure drop (in saturated temperature) | 1.5° C. |

-continued

| CONDENSER | |
|---|---|
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 4.

TABLE 4

| | Refrigerant | | | | | | |
|---|---|---|---|---|---|---|---|
| | 1 | 2 | 3 | 4 | 5 | 6 | 7 |
| Weight % 125 | 71 | 72 | 75 | 75 | 78 | 79.5 | 79 |
| Weight % 143a | 27 | 26.5 | 22.5 | 23 | 20 | 18 | 18 |
| Weight % 600a | 2 | 1.5 | 2.5 | 2 | 2 | 2.5 | 3 |
| Discharge pressure (bar) | 17.21 | 17.32 | 17.20 | 17.30 | 17.3 | 17.31 | 17.20 |
| Discharge temperature (° C.) | 80.5 | 80.4 | 79.7 | 79.8 | 79.9 | 79.0 | 79.0 |
| COP (system) | 1.49 | 1.49 | 1.49 | 1.49 | 1.48 | 1.48 | 1.48 |
| Capacity (kW/m$^3$) | 926 | 930 | 921 | 926 | 925 | 922 | 917 |
| Glide in evaporator (° C.) | 0.28 | 0.20 | 0.38 | 0.28 | 0.28 | 0.4 | 0.48 |
| Glide in condenser (° C.) | 0.45 | 0.34 | 0.57 | 0.45 | 0.45 | 0.6 | 0.69 |

EXAMPLE 4

Blends of R125, R143a and R600 were evaluated at a typical low temperature refrigeration condition using NIST's CYCLE D program.

| COOLING DUTY DELIVERED | 10 kW |
|---|---|
| EVAPORATOR | |
| Midpoint fluid condensing temperature | −30° C. |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 5

TABLE 5

| | Refrigerant | | | | |
|---|---|---|---|---|---|
| | 1 | 2 | 3 | 4 | 5 |
| Weight % 125 | 72 | 74 | 75.5 | 77 | 80 |
| Weight % 143a | 26.5 | 23.5 | 23 | 21 | 17 |
| Weight % 600 | 1.5 | 2.5 | 1.5 | 2 | 3 |
| Discharge pressure (bar) | 1706 | 1674 | 1713 | 1698 | 1668 |
| Discharge temperature (° C.) | 81.1 | 81.1 | 80.5 | 80.4 | 80.3 |
| COP (system) | 1.49 | 1.49 | 1.49 | 1.49 | 1.49 |
| Capacity (kW/m$^3$) | 912 | 891 | 913 | 902 | 879 |

TABLE 5-continued

| | Refrigerant | | | | |
|---|---|---|---|---|---|
| | 1 | 2 | 3 | 4 | 5 |
| Glide in evaporator (° C.) | 1.02 | 1.80 | 1.03 | 1.41 | 2.28 |
| Glide in condenser (° C.) | 0.96 | 1.63 | 0.97 | 1.31 | 2.02 |

EXAMPLE 5

Blends of R125, R143a, 600a and R600 were evaluated at a typical low temperature refrigeration condition using NIST's CYCLE D program.

| COOLING DUTY DELIVERED | 10 kW |
|---|---|
| EVAPORATOR | |
| Midpoint fluid condensing temperature | −30° C. |
| Superheating | 5.0° C. |
| Suction line pressure drop (in saturated temperature) | 1.5° C. |

-continued

| CONDENSER | |
|---|---|
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 6.

TABLE 6

| | Refrigerant | | | | |
|---|---|---|---|---|---|
| | 1 | 2 | 3 | 4 | 5 |
| Weight % 125 | 72.4 | 74.5 | 77 | 79.5 | 81 |
| Weight % 143a | 25 | 22.5 | 20 | 17.5 | 17 |
| Weight % 600a | 2 | 2.5 | 2 | 1.5 | 1 |
| Weight % 600 | 0.6 | 0.5 | 1 | 1.5 | 1 |
| Discharge pressure (bar) | 17.02 | 17.01 | 16.97 | 16.94 | 17.26 |
| Discharge temperature (° C.) | 80.4 | 80.0 | 79.8 | 79.6 | 79.3 |
| COP (system) | 1.49 | 1.49 | 1.49 | 1.49 | 1.48 |
| Capacity (kW/m$^3$) | 913 | 910 | 904 | 898 | 915 |
| Glide in evaporator (° C.) | 0.74 | 0.76 | 1.07 | 1.38 | 0.86 |
| Glide in condenser (° C.) | 0.84 | 0.91 | 1.13 | 1.36 | 0.89 |

EXAMPLE 6

Blends of R22 and R502 were evaluated at a typical low temperature refrigeration condition using NIST's CYCLE D program for comparison with the previous examples.

| COOLING DUTY DELIVERED EVAPORATOR | 10 kW |
|---|---|
| Midpoint fluid condensing temperature | −30° C. |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 7

TABLE 7

| | Refrigerant | |
|---|---|---|
| | R22 | R502 |
| Discharge pressure (bar) | 14.07 | 15.46 |
| Discharge temperature (° C.) | 132.4 | 93.5 |
| COP (system) | 1.60 | 1.55 |
| Capacity (kW/m$^3$) | 872 | 907 |
| Glide in evaporator (° C.) | 0 | 0.12 |
| Glide in condenser (° C.) | 0 | 0 |

EXAMPLE 7

Blends of R125, R143a, R290 and R600a were evaluated at a typical low temperature refrigeration condition in an open compressor using NIST's CYCLE D program.

| COOLING DUTY DELIVERED EVAPORATOR | 10 kW |
|---|---|
| Midpoint fluid condensing temperature | −35° C. |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| PARASITIC POWER | |
| Evaporator fan | 0.3 kW |
| Condenser fan | .4 kW |
| Controls | 0.1 kW |

The results of analysing the performances in a refrigeration unit using these operating conditions are shown in Table 8.

TABLE 8

| | Refrigerant | | | | | | | |
|---|---|---|---|---|---|---|---|---|
| | 1 | 2 | 3 | 4 | 5 | 6 | R22 | R502 |
| Weight % 125 | 77.5 | 76 | 77 | 78 | 79 | 80 | | |
| Weight % 143a | 20 | 21.5 | 20.5 | 19.5 | 18.4 | 17.3 | | |
| Weight % 600a | 1.9 | 1.8 | 1.8 | 1.9 | 2 | 2.1 | | |
| Weight % 290 | 0.6 | 0.7 | 0.7 | 0.6 | 0.6 | 0.6 | | |
| Discharge pressure (bar) | 17.59 | 17.62 | 17.58 | 17.60 | 17.60 | 17.61 | 14.07 | 15.46 |
| Discharge temperature (° C.) | 84.2 | 84.1 | 83.9 | 83.8 | 83.6 | 83.4 | 142.7 | 99.5 |
| COP (system) | 1.33 | 1.33 | 1.33 | 1.33 | 1.33 | 1.33 | 1.44 | 1.40 |
| Capacity (kW/m$^3$) | 1238 | 1239 | 1235 | 1236 | 1235 | 1234 | 1115 | 1177 |
| Glide in evaporator (° C.) | 0.46 | 0.46 | 0.45 | 0.45 | 0.47 | 0.48 | 0 | 0.14 |
| Glide in condenser (° C.) | 0.67 | 0.67 | 0.66 | 0.67 | 0.69 | 0.72 | 0 | 0.01 |

The invention claimed is:

1. A refrigerant composition consisting essentially of a refrigerant consisting of:
   a combination of hydrofluorocarbon and hydrocarbon components formulated as a replacement for chlorofluorocarbon refrigerant R502, consisting of a mixture of:

| R125 | 66 to 84% |
|---|---|
| R143a | 15 to 30% | and 0.1 to 5% of a mixture of isobutane and propane.

2. A refrigerant composition as claimed of claim 1 wherein the refrigerant consists of:

| R125 | 82.4 to 71% |
|---|---|
| R143a | 17 to 25% |
| Isobutane | 0.3 to 2.5% |
| Propane | 0.3 to 1.5%. |

3. A refrigerant composition as claimed in claim 1 consisting essentially wherein the refrigerant consists of:

| R125 | 79.8 to 75% |
|---|---|
| R143a | 19 to 22% |
| Isobutane | 0.6 to 2% |
| Propane | 0.6 to 1%. |

4. A refrigerant composition as claimed in claim 1 wherein the refrigerant consists of:

| R125 | 77.5% |
|---|---|
| R143a | 20% |
| Isobutane | 1.9% |
| Propane | 0.6%. |

5. An azeotropic refrigerant composition as claimed in claim 1 wherein the refrigerant consists of:

| R125 | 73.07% |
|---|---|
| R143a | 23.87% |
| Propane | 0.6% |
| Isobutane | 2.46%. |

6. A refrigerant composition as claimed in claim 1 wherein the refrigerant consists of:

| R125 | 77% |
|---|---|
| R143a | 20% |
| Isobutane | 2% |
| Propane | 1%. |

7. A refrigerant as claimed in claim 1, wherein the composition is contained in a refrigeration unit with a mineral oil or alkylbenzene oil, synthetic hydrocarbon or synthetic oxygen containing lubricant.

* * * * *